(12) United States Patent
Wei

(10) Patent No.: US 12,153,464 B2
(45) Date of Patent: Nov. 26, 2024

(54) PAIRED PROCESSING UNIT ARCHITECTURE FOR IMPROVED MICROCONTROLLER PERFORMANCE IN MULTI-CORE PROCESSOR

(71) Applicant: GREATER SHINE LIMITED, New Taipei (TW)

(72) Inventor: Jian Wei, San Diego, CA (US)

(73) Assignee: GREATER SHINE LIMITED, New Taipei (TW)

( * ) Notice: Subject to any disclaimer, the term of this patent is extended or adjusted under 35 U.S.C. 154(b) by 4 days.

(21) Appl. No.: 18/175,532

(22) Filed: Feb. 27, 2023

(65) Prior Publication Data

US 2023/0213960 A1 Jul. 6, 2023

Related U.S. Application Data

(63) Continuation of application No. PCT/US2021/014950, filed on Jan. 25, 2021.

(60) Provisional application No. 63/074,865, filed on Sep. 4, 2020.

(51) Int. Cl.
G06F 1/00 (2006.01)
G06F 1/10 (2006.01)

(52) U.S. Cl.
CPC ........................ *G06F 1/10* (2013.01)

(58) Field of Classification Search
CPC .............................. G06F 1/10; G06F 15/167
See application file for complete search history.

(56) References Cited

U.S. PATENT DOCUMENTS

| | | | | |
|---|---|---|---|---|
| 5,956,286 | A | * 9/1999 | Lattimore | ................. G11C 8/16 365/189.04 |
| 6,038,675 | A | * 3/2000 | Gabzdyl | .............. G06F 9/30014 713/600 |
| 2009/0158077 | A1 | 6/2009 | Hoyer | |
| 2015/0318033 | A1 | 11/2015 | Kajigaya | |
| 2018/0047432 | A1 | 2/2018 | Kondo | |

OTHER PUBLICATIONS

Young, Lee. International Application No. PCT/US21/14950, International Written Opinion and Search Report mailed Apr. 6, 2021, pp. 1-10.

* cited by examiner

*Primary Examiner* — Nitin C Patel
(74) *Attorney, Agent, or Firm* — PERKINS COIE LLP (57) ABSTRACT

An architecture in which the cores of a multicore processor are paired together. An internal memory may be connected to the pair of cores via separate leads. The pair of cores can run at reversed clock phases. A clock generator may be responsible for generating a clock signal that can be provided as input to one core, and a signal inverter may be responsible for inverting the clock signal so as to generate an inverted clock signal that can be provided as input to the other core.

20 Claims, 5 Drawing Sheets

PAIRED PROCESSING UNIT ARCHITECTURE FOR IMPROVED MICROCONTROLLER PERFORMANCE IN MULTI-CORE PROCESSOR

CROSS-REFERENCE TO RELATED APPLICATIONS

This application is a continuation application of International Application No. PCT/US2021/014950, which was filed on Jan. 25, 2021 and claims priority to U.S. Provisional Application No. 63/074,865, titled "Special Paired-CPU Architecture for Best 5G Modem Micro-Controller Performance" and filed on Sep. 4, 2020, which is incorporated herein by reference in its entirety.

TECHNICAL FIELD

Various embodiments concern architectures of processors with multiple cores.

BACKGROUND

Modern computing devices tend to have many microcontrollers. This is especially true for those computing devices that are designed to comply with the 4G and 5G wireless communication standards. Generally, each of the microcontrollers installed in a computing device is responsible for controlling a different hardware blocks so that functions can be performed properly in real time. The term "hardware block" may be used to refer to a set of hardware parts that are collectively operable to perform a function. Examples of hardware parts include general processors such as central processing units (CPUs), specialized processors such as graphical processing units (GPUs), memory, buses, logic circuits, and the like.

Various features of the technology that is described herein will become more apparent to those skilled in the art from a study of the Detailed Description in conjunction with the drawings. Embodiments are illustrated by way of example and not limitation in the drawings, in which like references may indicate similar elements. While certain embodiments are depicted in the drawings for the purpose of illustration, those skilled in the art will recognize that alternative embodiments may be employed without departing from the principles of the technology. The technology is amenable to various modifications.

DETAILED DESCRIPTION

Entities have developed multicore processors in an attempt to supplant traditional architectures in which multiple discrete processors were used for executing instructions. The term "multicore" refers to a processor that includes multiple processing units called "cores." Those skilled in the art will recognize that this terminology is somewhat malleable, however. As an example, it is not unusual for a multicore processor to be said to have multiple "processors" rather than multiple "cores."

At a high level, the cores of a processor are the fundamental computational structures that are capable of reading and then executing instructions. These processing units can be implemented on a circuit board that is representative of an integrated circuit. Multicore processors support greater performance since the multiple cores can perform tasks simultaneously. Right now, the most common multicore processors have dual-core architectures. Normally, a dual-core architecture is formed by pairing a high-performance, feature-rich processor with a low-power processor.

One benefit of a multicore processor is that its workload can be distributed amongst its cores. For example, the workload may be distributed across multiple processors to quicken and/or optimize performance of individual tasks. Another notable benefit of a multicore processor is its improved ability to react to interrupts.

Microcontrollers that include multicore processors are designed to provide responses to events that occur in the embedded systems that they are controlling. These events may be referred to as "interrupts." When certain events occur, an interrupt system can signal a multicore processor to suspend processing of an instruction sequence and then initiate a service routine that is based on the source of the interrupt. After completing the service routine, the multicore processor can resume processing of the instruction sequence. Sources of interrupts tend to be related to the computing device on which the microcontroller is implemented. Examples of sources include events such as internal timer overflows, completions of analog-to-digital conversion, logic-level changes responsive to inputs (e.g., a button being pressed), and receptions of data on communication channels (also referred to as "communication links").

While multicore processor may be able to readily address interrupts due to the multiple cores being able to operate independently, multicore processors can (and often will) experience issues with data coherency. At a high level, data coherency is a challenge for multicore processors since each core may want to work on the same internal memory simultaneously. Entities have historically attempted to address issues with data coherency by either implementing arbitration logic that governs access to the internal memory or providing a dedicated cache for each core.

Figure 1:
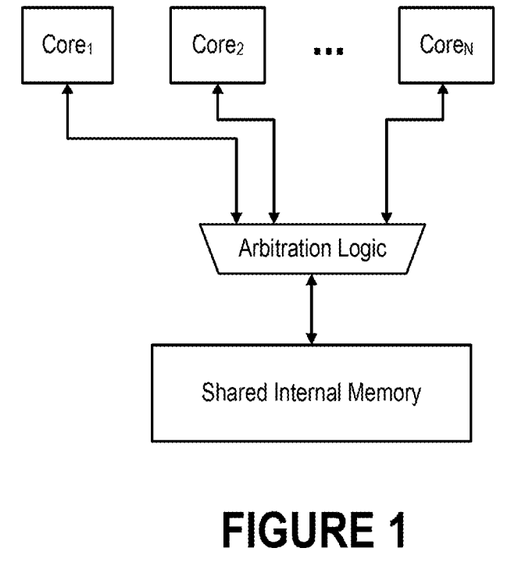
FIG. 1 illustrates how arbitration logic can be used to govern access to internal memory shared by multiple cores.

FIG. 1 illustrates how arbitration logic can be used to govern access to internal memory shared by multiple cores. While FIG. 1 illustrates an N-core architecture, those skilled in the art will recognize that processors have traditionally tended to have two- or four-core architectures. This arbitration logic may be applied by, for example, a bus that is responsible for transferring data between the cores and internal memory. This arbitration logic may be applied in situations where different cores attempt to access the internal memory in the same clock cycle (or simply "cycle"), so as to establish which core should be permitted to access the internal memory. Such an approach requires that the performance of each core be throttled down, however, as arbitration takes time to complete. Because arbitration may take several cycles to complete, and thus availability of the shared memory may become a bottleneck for the multicore processor (which may need to idle until arbitration is complete and the shared memory becomes available once again).

Figure 2:
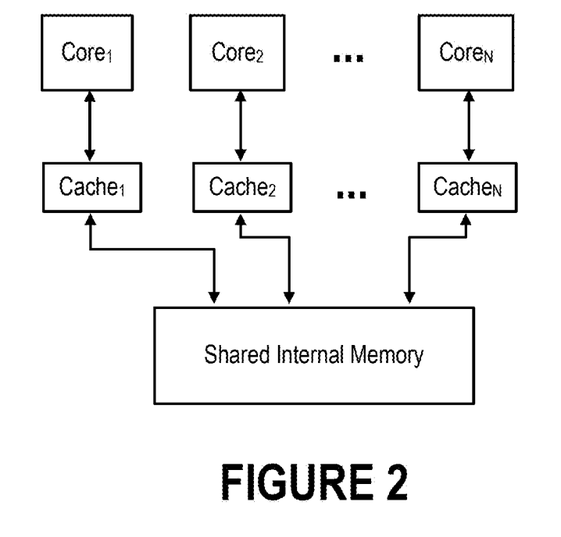
FIG. 2 illustrates how a dedicated cache may be provided for each core of a multicore processor.

FIG. 2 illustrates how a dedicated cache may be provided for each core of a multicore processor. Each dedicated cache may represent a local version of data stored in the internal memory. This approach allows each core to maintain high performance across its dedicated cache (also referred to as a "local cache") since each core is able to access its dedicated cache without concern. A cache system may be responsible for ensuring that coherency between different cores is maintained, for example, by copying data from each dedicated cache to the shared internal memory and other dedicated caches. However, this approach may result in significant disruptions to interrupt response latency when cache-miss situations occur. Moreover, this approach requires that significant amounts of power be consumed since data is constantly being copied into different locations to maintain coherency.

A third less common approach to increasing performance involves increasing the clock frequency of a multicore processor. This approach requires that the cores have a deeper pipeline design, which will impact the speed with which those cores are able to respond to interrupts. Cores with deeper pipelines tend to struggle with responding to interrupts in a reasonable timeframe, leading to high latency that is undesirable.

Introduced here, therefore, is an architecture in which the cores of a multicore processor are paired together to address the issues mentioned above. Assume, for example, that the novel architecture is implemented in a multicore processor that has a pair of cores installed on its circuit board. As mentioned above, the terms "processor" and "processing unit" may be used synonymously with the term "core." An internal memory may be connected to the pair of cores via separate leads so as to allow independent access by each core. To reduce conflicts in requesting access, the pair of cores can run at reversed clock phases. For example, a clock generator may be responsible for generating a clock signal that can be provided as input to one core, and a signal inverter (or simply "inverter") may be responsible for inverting the clock signal so as to generate an inverted clock signal that can be provided as input to the other core. Thus, access of the internal memory by one core may be governed by the clock signal while access of the internal memory by the other core may be governed by the inverted clock signal. Since the pair of cores access the internal memory in different clock phases, there will be no conflicts. Such an approach allows the pair of cores to access the internal memory in a seemingly exclusive manner, which ensures performance of the multicore processor can be maintained at high speeds.

There are several notable benefits to employing the architecture described herein. These benefits include (i) lower power consumption as no conflicts will occur (thereby rendering arbitration unnecessary) and (ii) lower cost due to more efficient use of hardware components. As an example, the circuit board may be smaller (i.e., require less silicon) if dedicated caches are no longer included in the multicore processor. These benefits may be particularly useful to portable computing devices (also referred to as "mobile computing devices") such as mobile phones, routers, modems, and the like. For example, the architecture may be used for multicore processors that are included in modems designed for 4G and 5G network technologies.

Aspects of the technology can be embodied using hardware, firmware, software, or any combination thereon. Accordingly, embodiments may include a non-transitory medium with instructions that, when executed, cause a multicore processor to perform a process in which complementary clock signals are provided to a pair of cores that are able to independently access a shared internal memory in opposite clock phrases.

Terminology

References in this description to "an embodiment," "one embodiment," and "some embodiments" means that the feature, function, structure, or characteristic being described is included in at least one embodiment. Occurrences of such phrases do not necessarily refer to the same embodiments, nor are they necessarily referring to alternative embodiments that are mutually exclusive of one another.

Unless the context clearly requires otherwise, the terms "comprise," "comprising," and "comprised of" are to be construed in an inclusive sense rather than an exclusive or exhaustive sense (i.e., in the sense of "including but not limited to"). The term "based on" is also to be construed in an inclusive sense rather than an exclusive or exhaustive sense. Thus, unless otherwise noted, the term "based on" is intended to mean "based at least in part on."

The terms "connected," "coupled," and any variants thereof are intended to include any connection or coupling between objects, either direct or indirect. The connection/coupling can be physical, logical, or a combination thereof. For example, objects may be electrically or communicatively coupled to one another despite not sharing a physical connection.

When used in reference to a list of multiple items, the word "or" is intended to cover all of the following interpretations: any of the items in the list, all of the items in the list, and any combination of items in the list.

The sequences of steps performed in the processes described herein are exemplary. Unless contrary to physical possibility, the steps may be performed in various sequences and combinations. For example, steps could be added to, or removed from, the processes described herein. Similarly, steps could be replaced or reordered. Thus, descriptions of any processes are intended to be open ended.

Overview of Paired-Core Architecture

Introduced here is an architecture in which the cores of a multicore processor are paired together to reduce or eliminate the likelihood of conflicts in requesting access to a shared internal memory. This architecture may be referred to as a "paired-core architecture." Each pair of cores may run at reversed clock phases to ensure that only one core is communicating with the shared internal memory at any given point in time. The term "reversed clock phases," as used herein, may be synonymous with the terms "opposite clock phases" and "complementary clock phases." Because access of the shared internal memory is governed by signals having reversed phases, the pair of cores will alternately access the shared internal memory.

Figure 3:
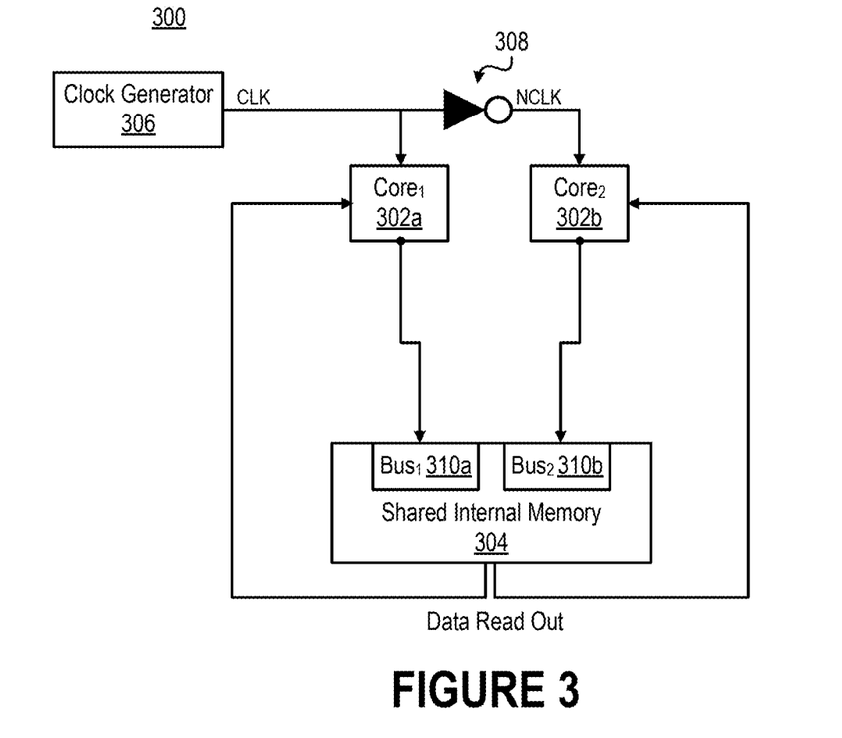
FIG. 3 includes a high-level illustration of a paired-core architecture for a multicore processor.

FIG. 3 includes a high-level illustration of a paired-core architecture for a multicore processor 300. Here, the multicore processor 300 includes a pair of cores 302a, 302b that are mounted on a circuit board (not shown). Generally, the cores 302a, 302b are identical to one another. Thus, the cores 302a, 302a may be the same type of processor. However, that need not necessarily be the case. In some embodiments, the cores 302a, 302b are different from one another, The multicore processor 300 also includes a shared internal memory 304 (or simply "shared memory") that is connected to the pair of cores 302a, 302b via separate buses 310a, 310b so as to allow independent access to the data stored therein. Normally, this is accomplished via leads that extend between each core and its corresponding bus. The shared memory 304 may be random access memory (RAM) that is installed on the circuit board. As shown in FIG. 3, access to the shared memory 304 may be governed by a clock signal (CLK) that is generated by a clock generator 306. The clock generator 306 may also be referred to as a "clock module." The clock generator 306 may be, for example, an electronic oscillator that is mounted on the circuit board.

As further discussed below, the clock signal can be used in order to synchronize the activities of the pair of cores 302a, 302b. For example, the clock signal that is generated by the clock generator 306 may be fed directly into a first core (e.g., Core$_1$ 302a) as input. Moreover, the clock signal may be fed directly into an inverter 308 that inverts the clock signal so as to generate an inverted clock signal (NCLK) that can be fed directly into a second core (e.g., Core$_2$ 302b). Such an approach causes access of the shared memory 304 by the first core to be governed by the clock signal while access of the shared memory 304 by the second core is governed by the inverted clock signal.

To ensure that the pair of cores 302a, 302b operate in opposite phases, the multicore processor 300 may use a "single-phase clock." Such an approach ensures that pair of cores 302a, 302b remain in sync with one another as a single signal is used to manage the activities of both cores. Other embodiments may employ a "two-phase clock" in which separate signals are distributed to the pair of cores 302a, 302b via separate wires, each of with non-overlapping pulses. "Single-phase clocks" are normally preferred over "two-phase clocks" since the latter requires a two-phase clock generator while the former requires a less expensive one-phase clock generator.

Figure 4:
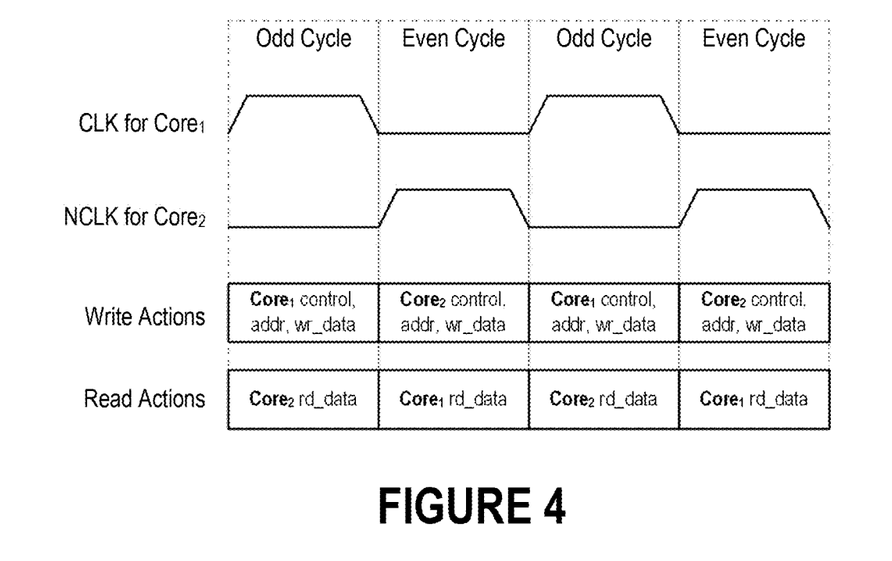
FIG. 4 illustrates how cores paired in the manner described above may be able to independently access a shared memory in a seemingly exclusive manner.

FIG. 4 illustrates how cores paired in the manner described above may be able to independently access a shared memory in a seemingly exclusive manner. Because these cores alternately access the shared memory, the cores may not "see" each other even though the cores may be accessible to one another through the shared memory. From the perspective of each core, the shared memory may appear to be solely "owned" by that core. This complementary approach to accessing the shared memory may also ensure that there are no conflicts between the cores (and thus no need for arbitration).

The clock signal (CLK) provided to a first core (e.g., Core$_1$ 302a) as input includes a series of "on" and "off" cycles. Similarly, the inverted clock signal (NCLK) provided to a second core (e.g., Core$_2$ 302b) as input includes a series of "on" and "off" cycles. As shown in FIG. 4, the beginning of each "on" cycle may correspond to a rising edge of the signal (e.g., CLK or NCLK) while the ending of each "on" cycle may correspond to a falling edge of the signal. Thus, the first core may operate on a rising edge of the clock signal while the second core may operate on a rising edge of the inverted clock signal. For convenience, the cycles in which the first core operates may be referred to as "odd cycles" while the phases in which the second core operates may be referred to as "even cycles."

The activities of the multicore processor can be sorted into two categories, namely, write actions and read actions. As further discussed below, write actions can be thought of as one-cycle actions while read actions can be thought of as two-cycle actions.

In each odd cycle, the first core may send a control signal to the shared memory that indicates to the shared memory the type of access being requested by the first core. Said another way, the control signal may indicate whether the first core is requesting read or write permission from the shared memory. If the first core is interested in reading data from the shared memory, then the control signal may be accompanied by an address that corresponds to the data to be read. As shown in FIG. 4, the shared memory can then provide the requested data to the first core in the following even cycle. If the first core is interested in writing data to the shared memory, then the control signal may be accompanied by an address that specifies where the data is to be written and the data itself. Write actions can be performed by the first core in a single cycle since no "response" is required from the shared memory.

In each even cycle, the second core may send a control signal to the shared memory that indicates to the shared memory the type of access being required by the second core. Said another way, the control signal may indicate whether the second core is requesting read or write permission from the shared memory. If the second core is interested in reading data from the shared memory, then the control signal may be accompanied by an address that corresponds to the data to be read. As shown in FIG. 4, the shared memory can then provide the requested data to the second core in the following odd cycle. If the second core is interested in writing data to the shared memory, then the control signal may be accompanied by an address that specifies where the data is to be written and the data itself. Write actions can be performed by the second core in a single cycle since no "response" is required from the shared memory.

The paired-core architecture can significantly improve the performance of computing devices in which microcontrollers with one or more multicore processors are installed. As an example, the paired-core architecture may help improve efficiency of models designed to communicate via broadband cellular networks. Multicore processors having a paired-core architecture may be able to keep each core running at high performance levels while still allowing the cores to communicate with one another in an efficient manner. In short, multicore processors having a paired-core architecture may support data sharing amongst the cores without suffering performance penalties.

Figure 5:
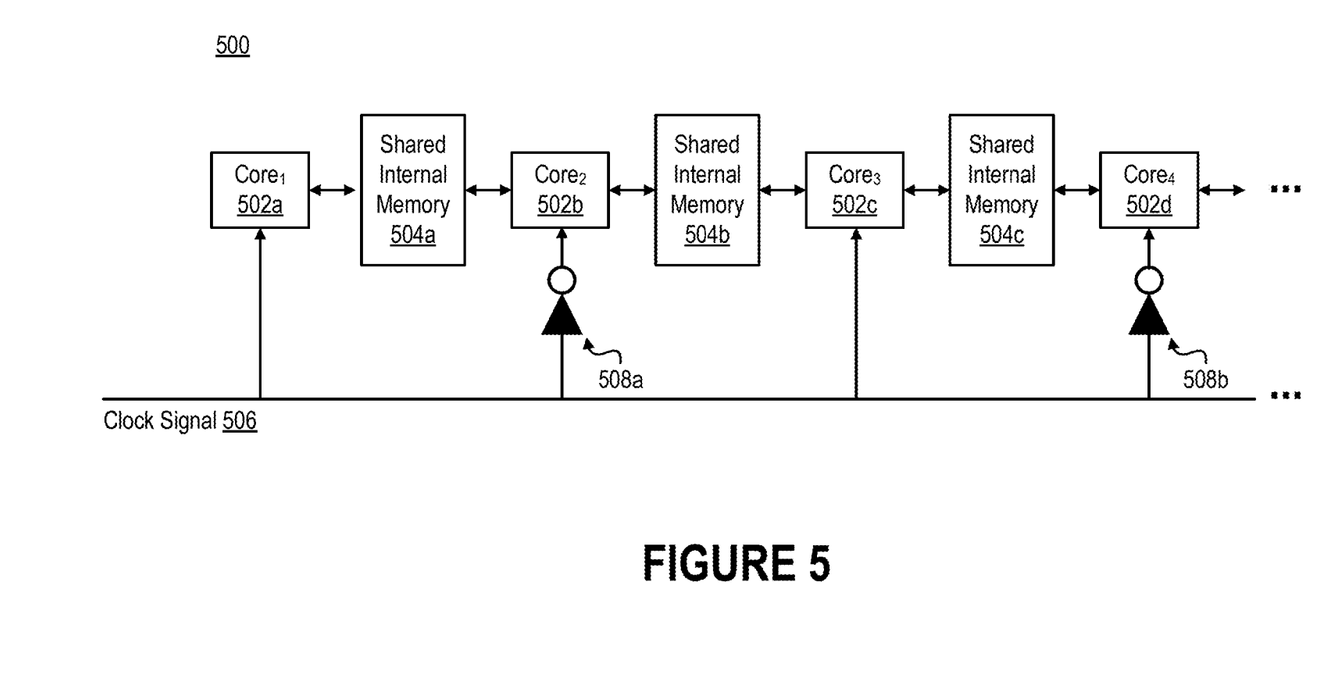
FIG. 5 illustrates how a series of cores included in a multicore processor 500 can be paired with one another to form multiple pairs of cores.

FIG. 5 illustrates how a series of cores included in a multicore processor 500 can be paired with one another to form multiple pairs of cores. Here, there are three pairs of cores, namely, (i) a first pair that includes Core$_1$ 502a and Core$_2$ 502b, (ii) a second pair that includes Core$_2$ 502b and Core$_3$ 502c, and (iii) a third pair that includes Core$_3$ 502c and Core$_4$ 502d. These successive pairs of cores may be referred to as a "core pipeline" that may be used to solve computationally intensive problems in a resource-efficient manner. As shown in FIG. 5, Core$_1$ 502a and Core$_2$ 502b may alternately access a first shared memory 504a. Moreover, Core$_2$ 502b and Core$_3$ 502c may alternately access a second shared memory 504b while Core$_3$ 502c and Core$_4$ 502d may alternately access a third shared memory 504c.

Some cores may alternate between accessing a shared memory and taking no action, while other cores may alternate between accessing one shared memory and accessing another shared memory. Here, for example, Core$_1$ 502a and Core$_2$ 502b will alternately access the first shared memory 504a. As shown in FIG. 5, a clock signal 506 may govern when Core' 502a accesses the first shared memory 504a while an inverse clock signal may govern when Core$_2$ 502b accesses the first shared memory 504a. The inverse clock signal may be generated by an inverter 508a to which the clock signal 506 is provided as input. When Core$_2$ 502b is accessing the first shared memory 504a, Core$_1$ 502a may not take any action (other than receive data if a read request was submitted to the first shared memory 504a in the previous cycle as discussed above). Conversely, when Core$_1$ 502a is accessing the first shared memory 504a, Core$_2$ 502b may access the second shared memory 504b. Accordingly, Core$_2$ 502b may alternately access the first shared memory 504a and second shared memory 504b. The same may hold true for Core$_3$ 502c, which may alternately access the second shared memory 504b and third shared memory 504c, and Core$_4$ 502d, which may alternately access the third shared memory 504c and fourth shared memory (not shown).

Any number of cores may be arranged in series with memories shared therebetween. As shown in FIG. 5, this is permitted because a single clock signal 506 may be used to govern access of the shared memories by the series of cores. However, as discussed above, in each pair of cores, access by one core will be governed by the clock signal 506 while access by the other core will be governed by inverse clock signal. Each inverse clock signal may be generated by a corresponding inverter that is configured to invert the clock signal 506 so as to generate an inverted clock signal that can be provided as input to the corresponding core. Here, for example, a first inverter 508a is responsible for generating an inverted clock signal that can be provided as input to Core$_2$ 502b, and a second inverter 508b is responsible for generating an inverted clock signal that can be provided as input to Core$_4$ 502d. Meanwhile, the clock signal 506 may be fed directly into Core$_1$ 502a and Core$_3$ 502c as shown in FIG. 5.

Figure 6:
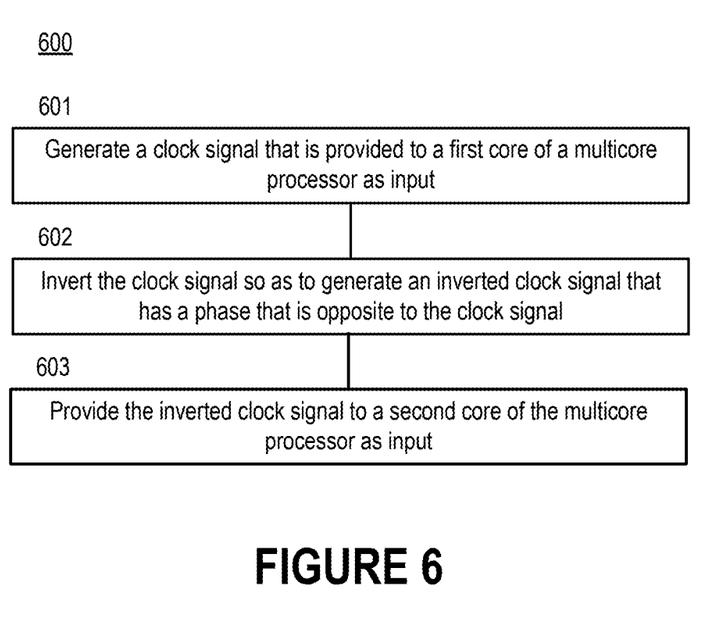
FIG. 6 includes a flow diagram of a process for facilitating alternate access of an internal memory shared between a pair of cores.

FIG. 6 includes a flow diagram of a process 600 for facilitating alternate access of an internal memory shared between a pair of cores. Note that the steps of the process 600 may be performed by individual components of a multicore processor. Initially, a clock generator may generate a clock signal that is provided to a first core as input (step 601). This clock signal may govern access of the internal memory by the first core. This clock signal may also be provided to an inverter as input. The inverter may invert the clock signal so as to generate an inverted clock signal that has a phase that is opposite to the clock signal (step 602). Said another way, the clock signal and inverted clock signal may complementary to one another in the sense that the clock signal may have an "on" cycle while the inverted clock signal has an "off" cycle and vice versa.

This inverted clock signal can be provided to a second core as input (step 603). This inverted clock signal may govern access of the internal memory by the second core. The opposite phases of the clock signal and inverted clock signal may cause the shared memory to be accessed by either the first core or second core in each cycle.

Computing Device

Figure 7:
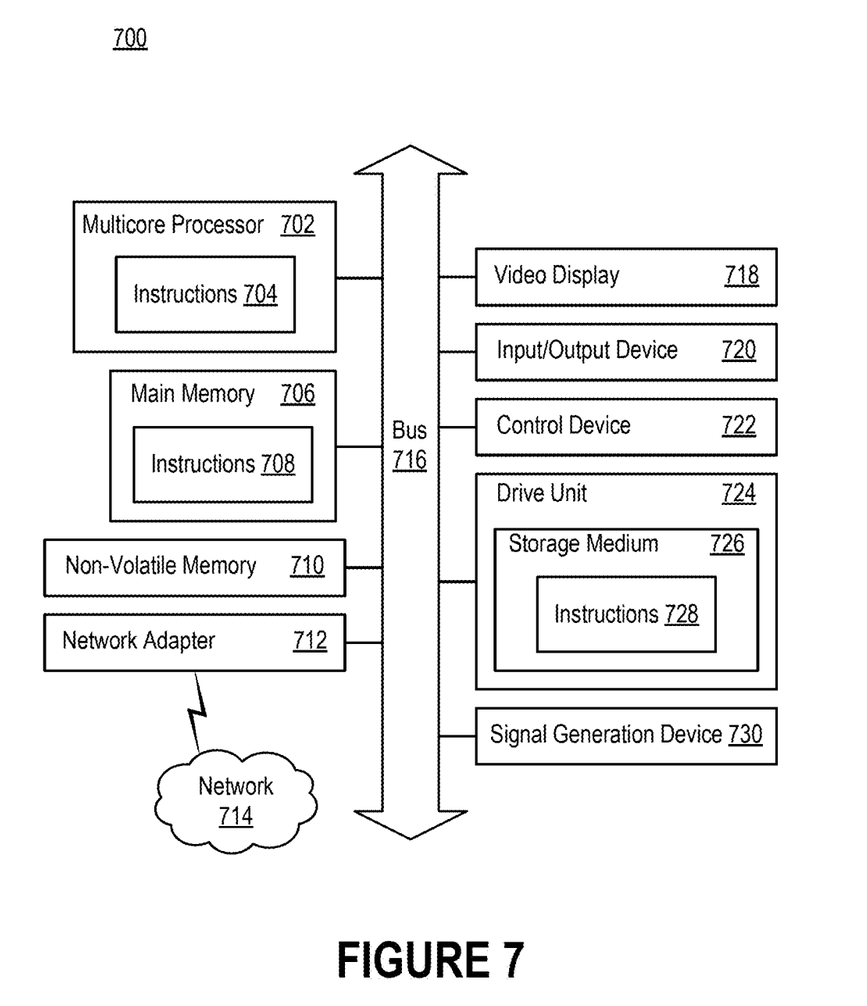
FIG. 7 includes a high-level block diagram that illustrates an example of a computing device in which the multicore processor described herein can be implemented.

FIG. 7 includes a high-level block diagram that illustrates an example of a computing device 700 in which one or more multicore processors having paired-core architectures can be implemented. The computing system 700 may include a multicore processor 702, main memory 706, non-volatile memory 710, network adapter 712, video display 718, input/output device 720, control device 722, drive unit 724 that includes a storage medium 726, signal generation device 730, or any combination thereof. These components can be communicatively connected to a bus 716. The bus 716 is illustrated as an abstraction that represents physical buses or point-to-point connections that are connected by appropriate bridges, adapters, or controllers. Thus, the bus 716 may be a system bus, Peripheral Component Interconnect (PCI) bus, PCI-Express bus, HyperTransport bus, Industry Standard Architecture (ISA) bus, Small Computer System Interface (SCSI) bus, Universal Serial Bus (USB), Inter-Integrated Circuit (I$^2$C) bus, or bus compliant with Institute of Electrical and Electronics Engineers (IEEE) Standard 1394.

While the main memory 706, non-volatile memory 710, and storage medium 724 are shown to be a single medium, the terms "storage medium" and "machine-readable medium" should be taken to include a single medium or multiple media that store one or more sets of instructions 726. The terms "storage medium" and "machine-readable medium" should also be taken to include any medium that is capable of storing, encoding, or carrying a set of instructions for execution by the computing device 700. Sequences of instructions (e.g., instructions 704, 708, 728) that are indicative of computer programs may be set at various times in various memories and storage devices in the computing device 700. When read and executed by the multicore processor 702, the instructions may cause the computing device 700 to perform operations to execute various aspects of the computer programs.

The network adapter 712 enables the computing device 700 to mediate data in a network 714 with an entity that is external to the computing device 700 through any communication protocol supported by the computing device 700 and external entity. For example, the computing device 700 and external entity may be able to communicate with one another via a broadband cellular network (e.g., a 4G or 5G cellular network). The network adapter 712 can include a network adaptor card, a wireless network interface card, a switch, a protocol converter, a gateway, a bridge, a hub, a receiver, a repeater, or a transceiver that includes an integrated circuit (e.g., enabling communication over Bluetooth® or Wi-Fi®).

Remarks

The foregoing description of various embodiments has been provided for the purposes of illustration. It is not intended to be exhaustive or to limit the claimed subject matter to the precise forms disclosed. Modifications of these various embodiments will be apparent to one skilled in the art. Embodiments were chosen and described in order to best describe the principles of the technology and its practical applications, thereby enabling those skilled in the relevant art to understand the present disclosure.

Although the Detailed Description describes various embodiments, the technology can be practiced in many ways no matter how detailed the Detailed Description appears. Embodiments may vary considerably in their implementation details, while still being encompassed by the present disclosure. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the present disclosure encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the present disclosure be limited not by this Detailed Description, but rather by any claims that issue on an application based hereon. Accordingly, the description of various embodiments is intended to be illustrative, but not limiting, of the scope of the technology as set forth in the following claims.

What is claimed is:

1. A processor comprising:
    a plurality of cores that includes at least a first core and a second core;
    an internal memory that is connected to the first and second cores via separate leads so as to allow independent access by the first and second cores;
    a clock generator that is configured to produce a clock signal that is provided as input to the first core; and
    an inverter that is configured to invert the clock signal to generate an inverted clock signal that is provided as input to the second core;
    wherein access of the internal memory by the first core is governed by the clock signal while access of the internal memory by the second core is governed by the inverted clock signal.

2. The processor of claim 1, wherein the first core operates on a rising edge of the clock signal while the second core operates on a rising edge of the inverted clock signal.

3. The processor of claim 1, wherein the clock signal and the inverted clock signal have complementary phases, thereby ensuring that the internal memory is accessed by either the first core or the second core in each cycle.

4. The processor of claim 1, wherein the plurality of cores further includes a third core, and wherein the processor further comprises:
    a second internal memory that is connected to the second and third cores via separate leads so as to allow independent access by the second and third cores.

5. The processor of claim 4, wherein the second core is configured to alternately access the internal memory and the second internal memory over successive cycles.

6. The processor of claim 4, wherein the clock signal is further provided as input to the third core.

7. The processor of claim 6, wherein access of the second internal memory by the second core is governed by the inverted clock signal while access of the second internal memory by the third core is governed by the clock signal.

8. A method for controlling a multicore processor, the method comprising:
    generating a clock signal that is provided to a first core of the multicore processor as input, where the clock signal governs access of an internal memory by the first core;
    inverting the clock signal so as to generate an inverted clock signal; and
    providing the inverted clock signal to a second core of the multicore processor as input, where the inverted clock signal governs access of the internal memory by the second core.

9. The method of claim 8, wherein the clock signal and the inverted clock signal have complementary phases, thereby ensuring that the internal memory is accessed by either the first core or the second core in each cycle.

10. The method of claim 8, wherein the clock signal is produced by a single-phase clock generator that is connected, via separate leads, to (i) the first processing unit and (ii) an inverter that is responsible for inverting the clock signal so as to generate the inverted clock signal.

11. A multicore processor comprising:
    an internal memory;
    an inverter configured to invert a clock signal that is provided as input so as to generate an inverted clock signal that a reversed phase;
    a first core whose access to the internal memory is governed by the clock signal; and
    a second core whose access to the internal memory is governed by the inverted clock signal.

12. The multicore processor of claim 11, further comprising:
    a clock generator configured to produce the clock signal.

13. The multicore processor of claim 11, wherein a falling edge of the clock signal coincides with a rising edge of the inverted clock signal while a rising edge of the clock signal coincides with a falling edge of the inverted clock signal.

14. The multicore processor of claim 11, wherein the internal memory includes a first bus to which the first core is communicatively connected and a second bus to which the second core is communicatively connected.

15. The multicore processor of claim 11, wherein the first core is identical to the second core.

16. The multicore processor of claim 11, wherein the internal memory is one of multiple internal memories included in the multicore processor.

17. The multicore processor of claim 16, wherein each of the multiple internal memories is shared between a pair of cores.

18. The multicore processor of claim 11, further comprising:
    a second internal memory; and
    a third core whose access to the second internal memory is governed by the clock signal.

19. The multicore processor of claim 18, wherein the second core alternately accesses the internal memory and the second internal memory.

20. The multicore processor of claim 11, wherein the first and second cores are connected to the internal memory via separate leads.

* * * * *